US012473880B2

(12) United States Patent
Ogawa et al.

(10) Patent No.: US 12,473,880 B2
(45) Date of Patent: Nov. 18, 2025

(54) SOLENOID DEVICE AND ELECTROMAGNETIC VALVE FOR FUEL INJECTION SYSTEM

(71) Applicants: MITSUBISHI HEAVY INDUSTRIES ENGINE & TURBOCHARGER, LTD., Sagamihara (JP); TOHO SEISAKUSHO CO., LTD., Ome (JP)

(72) Inventors: Hisao Ogawa, Kanagawa (JP); Satoshi Hosoda, Tokyo (JP)

(73) Assignees: MITSUBISHI HEAVY INDUSTRIES ENGINE & TURBOCHARGER, LTD., Sagamihara (JP); TOHO SEISAKUSHO CO., LTD., Tokyo (JP)

( * ) Notice: Subject to any disclaimer, the term of this patent is extended or adjusted under 35 U.S.C. 154(b) by 0 days.

(21) Appl. No.: 18/571,594

(22) PCT Filed: Jul. 7, 2022

(86) PCT No.: PCT/JP2022/026991
§ 371 (c)(1),
(2) Date: Dec. 18, 2023

(87) PCT Pub. No.: WO2023/008132
PCT Pub. Date: Feb. 2, 2023

(65) Prior Publication Data
US 2024/0287954 A1 Aug. 29, 2024

(30) Foreign Application Priority Data
Jul. 27, 2021 (JP) ................................ 2021-122275

(51) Int. Cl.

| | |
|---|---|
| ***F02M 63/00*** | (2006.01) |
| ***F02M 51/00*** | (2006.01) |
| ***F02M 61/20*** | (2006.01) |

(52) U.S. Cl.
CPC ...... *F02M 63/0017* (2013.01); *F02M 51/005* (2013.01); *F02M 61/20* (2013.01)

(58) Field of Classification Search
CPC .... F02M 47/00; F02M 47/027; F02M 55/002; F02M 55/007; F02M 55/008;
(Continued)

(56) References Cited

U.S. PATENT DOCUMENTS 3,805,099 A * 4/1974 Kelly .................... H01F 7/1638
310/12.32
3,865,312 A 2/1975 Lombard et al.
(Continued)

FOREIGN PATENT DOCUMENTS

DE 2 309 458 A1 7/1973
DE 19629589 B4 * 8/2007 ........... F02M 31/125
(Continued)

OTHER PUBLICATIONS

What is Transformer Bobbin? What is transformer bobbin used for? | GOTREND | (Year: 2024).*
(Continued)

*Primary Examiner* — Hai H Huynh
*Assistant Examiner* — Johnny H Hoang
(74) *Attorney, Agent, or Firm* — Birch, Stewart, Kolasch & Birch, LLP

(57) ABSTRACT

A solenoid device is configured to drive by electromagnetic force a valve unit in an electromagnetic valve provided to a fuel injection system. The solenoid device includes: a cylindrical core; a coil wound around the core; a casing housing the core and the coil and that covers at least one end of the core on one side in an axial direction; a terminal fixing member disposed between the core and the casing in the axial direction to fix a terminal connected to the coil; and a cylindrical member disposed on an inner circumference of
(Continued)

the core in a manner of passing through the core and the casing in the axial direction. The cylindrical member has a protrusion that radially protrudes in a direction perpendicular to the axial direction and is held between the casing and the terminal fixing member from both sides in the axial direction.

5 Claims, 6 Drawing Sheets

(58) Field of Classification Search
CPC ............... F02M 61/16; F02M 63/0015; F02M 63/0017; F02M 63/0019; F02M 2200/16; F02M 59/366; F02M 59/466; F02M 57/023; F02M 63/0061; F02M 63/0049; F02M 2547/003; F02M 2547/008; H01F 7/1638
See application file for complete search history.

(56) References Cited

U.S. PATENT DOCUMENTS 6,834,844 B1 * 12/2004 Hamada ............... F02M 61/168 239/585.4
7,571,891 B2 8/2009 Kuno
2004/0108395 A1 * 6/2004 Hamada .................... H01F 5/02 251/129.09
2005/0067512 A1 * 3/2005 Shimizu ............... F02M 69/044 239/585.1
2007/0057218 A1 3/2007 Kuno
2008/0237520 A1 * 10/2008 Sugiyama ............... H01F 7/081 251/129.21
2009/0212136 A1 8/2009 Wakabayashi
2011/0001073 A1 * 1/2011 Ogawa ................. F02M 61/168 251/129.15
2011/0050376 A1 * 3/2011 Gerster .............. F02M 51/0653 335/297
2012/0227709 A1 * 9/2012 Kusakabe .......... F02M 51/0685 123/472
2018/0163685 A1 * 6/2018 Yasukawa ........... F16K 31/0675
2019/0353127 A1 * 11/2019 Ilia ......................... F02M 61/10

FOREIGN PATENT DOCUMENTS

DE 10 2008 010 561 A1 9/2009
EP 2 749 799 A1 7/2014
JP 2003-269647 A 9/2003
JP 2006-194237 A 7/2006
JP 2007-64364 A 3/2007
JP 2010-174753 A 8/2010

OTHER PUBLICATIONS

International Search Report for PCT/JP2022/026991 mailed on Sep. 20, 2022.
Extended European Search Report for European Application No. 22849197.3, dated Sep. 17, 2024.
Korean Office Action for Korean Application No. 10-2023-7043432, dated Jun. 27, 2025, with English translation.

* cited by examiner

SOLENOID DEVICE AND ELECTROMAGNETIC VALVE FOR FUEL INJECTION SYSTEM

FIELD

The present disclosure relates to a solenoid device and an electromagnetic valve for a fuel injection system.

BACKGROUND

A common rail fuel injection system used in an engine such as a diesel engine includes a fuel pump, a common rail, and fuel injectors. The fuel pump suctions the fuel from a fuel tank, pressurizes the fuel, and supplies the fuel as high-pressure fuel into the common rail. The common rail keeps the high-pressure fuel from the fuel pump at a predetermined pressure. The fuel injectors open and close the injection valves, to inject high-pressure fuel in the common rail into the combustion chamber of the diesel engine.

Such a fuel injector includes, for example, a solenoid device that generates electromagnetic force, by applying an electric current to the coil wound around the core, and an electromagnetic valve having a valve unit made from a magnetic material. Such an electromagnetic valve applies an elastic force to the valve unit to block the fuel channel, for example. While no electromagnetic force is generated by the solenoid device, the valve unit is caused to close the fuel channel by the elastic force. With the electromagnetic force being generated by the solenoid device, the electromagnetic force in the solenoid device pulls the valve unit, and causes the valve unit to separate from the channel, to open the channel.

As a stopper for ensuring a very narrow gap between the valve unit and the solenoid device, so as not to bring the valve unit into contact with the electromagnetic force generating surface of the solenoid device when the valve unit is attracted toward the solenoid device, a configuration that includes a cylindrical sleeve or the like embedded in the core, and in which the valve unit is brought into contact with only this part has been known (see, for example, Patent Literature 1).

CITATION LIST

Patent Literature

Patent Literature 1: Japanese Patent Application Laid-open No. 2006-194237

SUMMARY

Technical Problem

In the configuration described in Patent Literature 1, when the valve unit is brought into contact with the sleeve, the impact is applied to the core and other internal parts of the solenoid device via the sleeve, and weakens the force by which the sleeve is fixed, and may cause instability in the lift of the valve unit. Therefore, there has been a demand for a solenoid device with a stopper that is highly shock resistant.

The present disclosure is made in view of the above, and an object of the present disclosure is to provide a solenoid device and an electromagnetic valve for a fuel injection system, having a stopper structure with excellent shock resistance.

Solution to Problem

A solenoid device according to the present disclosure is configured to drive by electromagnetic force a valve unit in an electromagnetic valve provided to a fuel injection system. The solenoid device includes: a cylindrical core; a coil that is wound around the core; a casing that houses the core and the coil and covers at least one end of the core on one side in an axial direction of a center axis; a terminal fixing member that is disposed between the core and the casing in the axial direction to fix a terminal connected to the coil; and a cylindrical member that is disposed on an inner circumference of the core in a manner of passing through the core and the casing in the axial direction, the cylindrical member having a protrusion that radially protrudes in a direction perpendicular to the axial direction and is held between the casing and the terminal fixing member from both sides in the axial direction, the cylindrical member having an end on another side of the axial direction located at a position that is allowed to come into contact with the valve unit.

An electromagnetic valve for a fuel injection system according to the present disclosure includes: the above-described solenoid device; and a valve unit that is made from a magnetic material, disposed facing an end of the core on the other side in the axial direction, and applied with an elastic force in a direction separating from the core in the axial direction, the valve unit being configured to block and close a passage for fuel by the elastic force when no electromagnetic force is generated by the solenoid device, and to open the passage by being attracted toward the core by the electromagnetic force to a position where the valve unit is brought into contact with the cylindrical member so that the valve unit is separated from the passage, when the electromagnetic force is generated by the solenoid device.

Advantageous Effects of Invention

According to the present disclosure, it is possible to provide a solenoid device and an electromagnetic valve for a fuel injection system, having an excellent shock resistance.

DESCRIPTION OF EMBODIMENTS

An embodiment of a solenoid device and an electromagnetic valve for a fuel injection system according to the present disclosure will now be explained with reference to drawings. The embodiment is not intended to limit the scope of the present invention in any way. Elements in the following embodiments include those that are replaceable and that are easily replaced by those skilled in the art, or those that are substantially the same.

Figure 1:
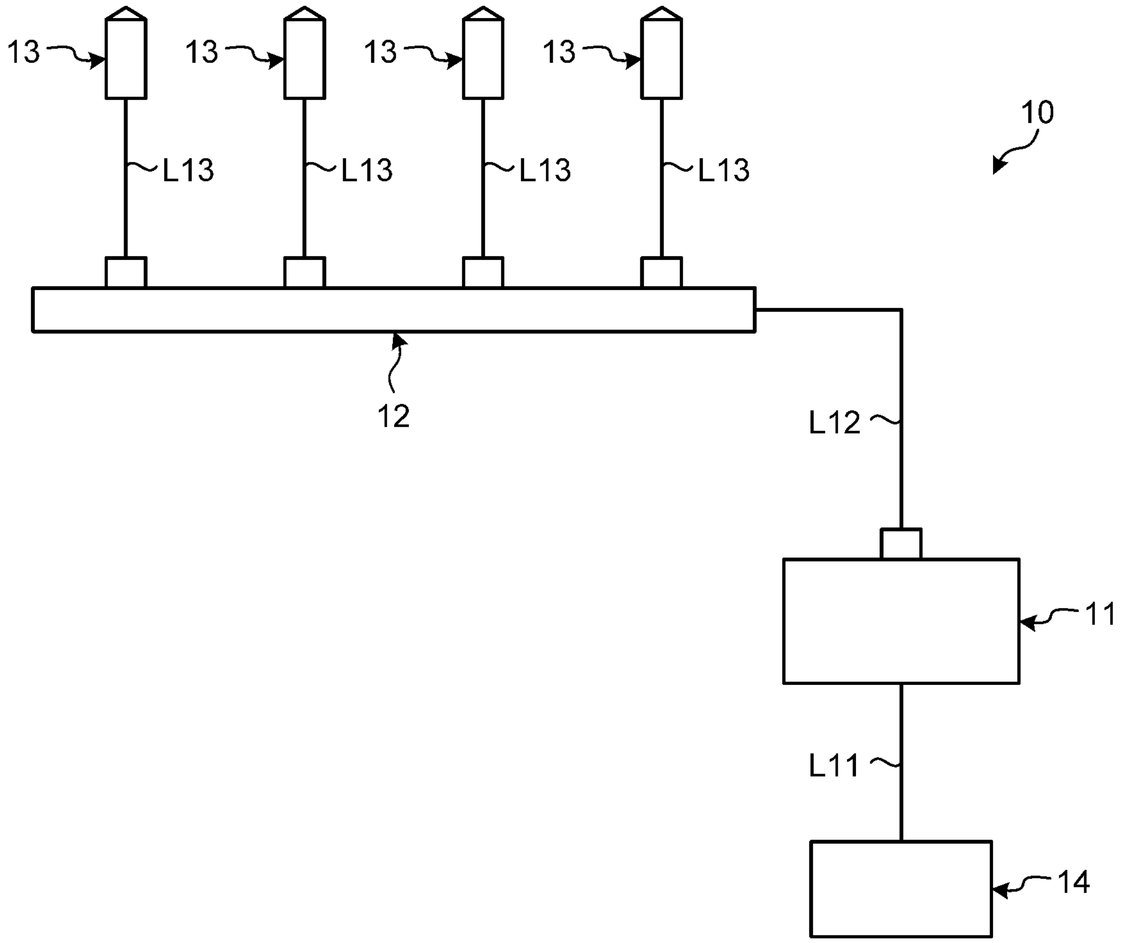
FIG. 1 is a schematic diagram of a fuel injection system.

FIG. 1 is a schematic diagram of a fuel injection system 10. As illustrated in FIG. 1, the fuel injection system 10 is installed in a diesel engine (internal combustion engine). The fuel injection system 10 includes a fuel pump 11, a common rail 12, and a plurality of fuel injectors 13.

The fuel pump 11 is connected to a fuel tank 14 via a fuel line L11. The fuel pump 11 suctions the fuel stored in the fuel tank 14 via the fuel line L11, and pressurizes the fuel into high-pressure fuel. The fuel pump 11 is connected to the common rail 12 via a high-pressure fuel line L12. The common rail 12 keeps the high-pressure fuel supplied from the fuel pump 11 at a predetermined pressure. The common rail 12 is connected to the fuel injectors 13 via a plurality of (four, in this embodiment) fuel supply lines L13, respectively. Each of the fuel injectors 13 opens and closes the corresponding electromagnetic valve, to inject high-pressure fuel in the common rail 12 into the corresponding cylinder (combustion chamber) of the diesel engine.

Figure 2:
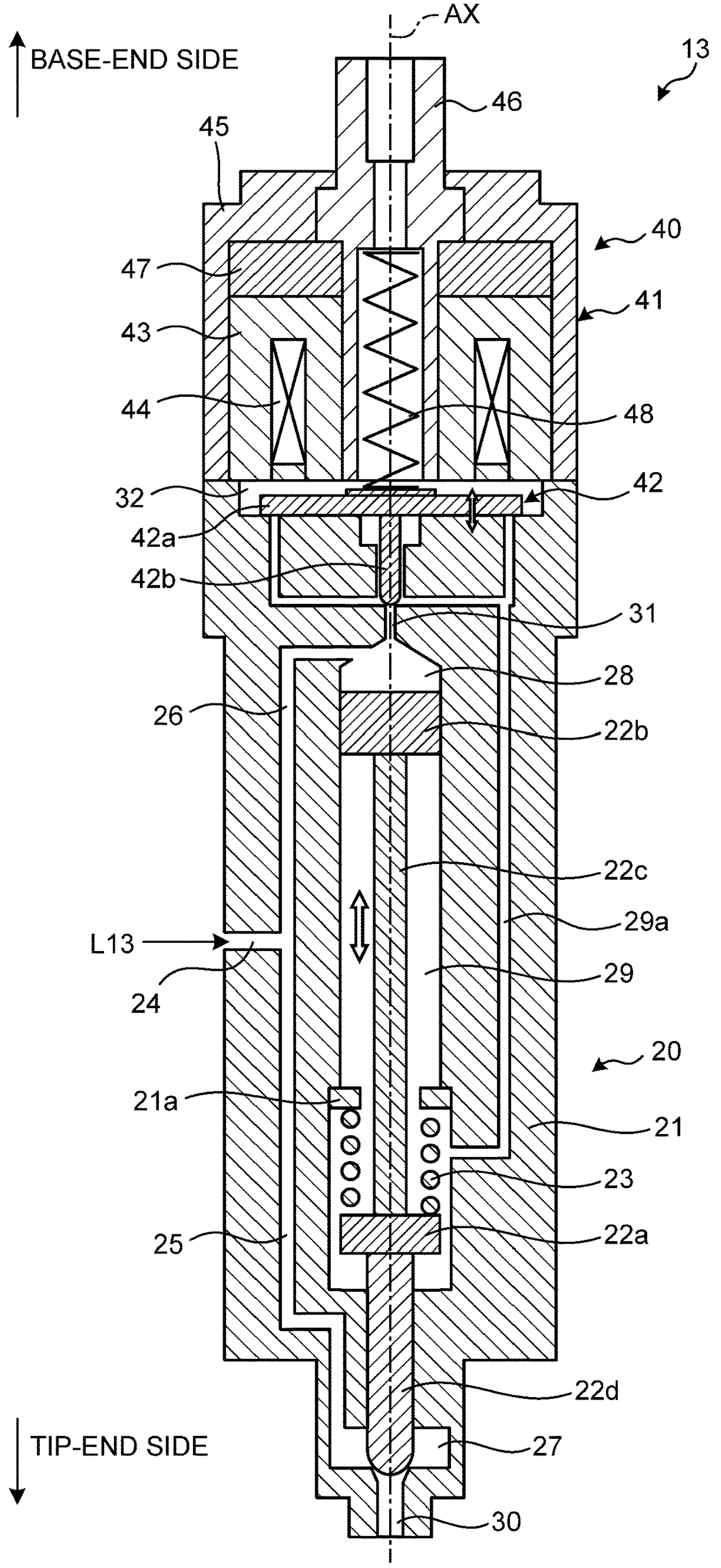
FIG. 2 is a longitudinal cross-sectional view of a fuel injector.

FIG. 2 is a longitudinal cross-sectional view of the fuel injector 13. As illustrated in FIG. 2, the fuel injector 13 has a shape extending in the axial direction of a center axis AX, and includes an injection unit 20 and an electromagnetic valve 40. In explaining the configuration of the fuel injector 13, the side of a fuel injection port 30 in the axial direction of the center axis AX will be referred to as a tip-end side, and the side of the electromagnetic valve 40 will be referred to as a base-end side.

The injection unit 20 includes a casing 21 and a piston valve 22. The casing 21 includes a fuel inlet 24, an injection-side channel 25, a control-side channel 26, an injection-side pressure chamber 27, a control-side pressure chamber 28, a cylinder chamber 29, a fuel injection port 30, a fuel discharge port 31, and an electromagnetic-valve-side pressure chamber 32.

The fuel inlet 24 allows the entry of the fuel via the fuel supply line L13. The injection-side channel 25 connects the fuel inlet 24 to the injection-side pressure chamber 27. The control-side channel 26 connects the fuel inlet 24 to the control-side pressure chamber 28.

The injection-side pressure chamber 27 is connected to the fuel injection port 30. The fuel injection port 30 is disposed at the tip end of the casing 21, and discharges the fuel into the corresponding cylinder of the diesel engine.

The control-side pressure chamber 28 is connected to the fuel discharge port 31. The fuel discharge port 31 is disposed at the base end of the casing 21, and is connected to the electromagnetic-valve-side pressure chamber 32. The electromagnetic-valve-side pressure chamber 32 is connected to the electromagnetic valve 40 (a space 46*d*, which will be described later).

The cylinder chamber 29 is connected to the injection-side pressure chamber 27 and the control-side pressure chamber 28. The piston valve 22 is housed in the cylinder chamber 29. The cylinder chamber 29 is connected to the electromagnetic-valve-side pressure chamber 32 via a channel 29*a*.

The piston valve 22 is housed inside the cylinder chamber 29, and is provided movably toward the injection-side pressure chamber 27 or toward the control-side pressure chamber 28. The piston valve 22 has a spring seat member 22*a*, a control-side piston member 22*b*, a joint member 22*c*, and a valve 22*d*. The spring seat member 22*a*, the control-side piston member 22*b*, and the joint member 22*c* are configured as one piece. The spring seat member 22*a* receives the elastic force of an elastic member 23, which will be described later. The control-side piston member 22*b* receives the pressure inside the control-side pressure chamber 28. The joint member 22*c* joins the spring seat member 22*a* and the control-side piston member 22*b*. The valve 22*d* protrudes from the spring seat member 22*a* toward the tip-end side in the axial direction of the center axis AX. The valve 22*d* is brought into contact with the spring seat member 22*a* by the net force of the pressure received from the pressure chambers and the elastic force. The tip end of the valve 22*d* has a shape enabled to close the fuel injection port 30. The valve 22*d* receives the pressure of the injection-side pressure chamber 27.

When the pressure inside the injection-side pressure chamber 27 is lower than the net force of the pressure from the control-side pressure chamber 28 and the elastic force of the elastic member 23, the piston valve 22 is pressed toward the injection-side pressure chamber 27. In this configuration, the fuel injection port 30 is closed by the valve 22*d*. From this configuration, when the pressure inside the injection-side pressure chamber 27 rises to a level higher than the net force of the pressure inside the control-side pressure chamber 28 and the elastic force of the elastic member 23, the piston valve 22 is pressed toward the control-side pressure chamber 28. The valve 22*d* is then separated from the fuel injection port 30, and the fuel injection port 30 is opened.

Figure 3:
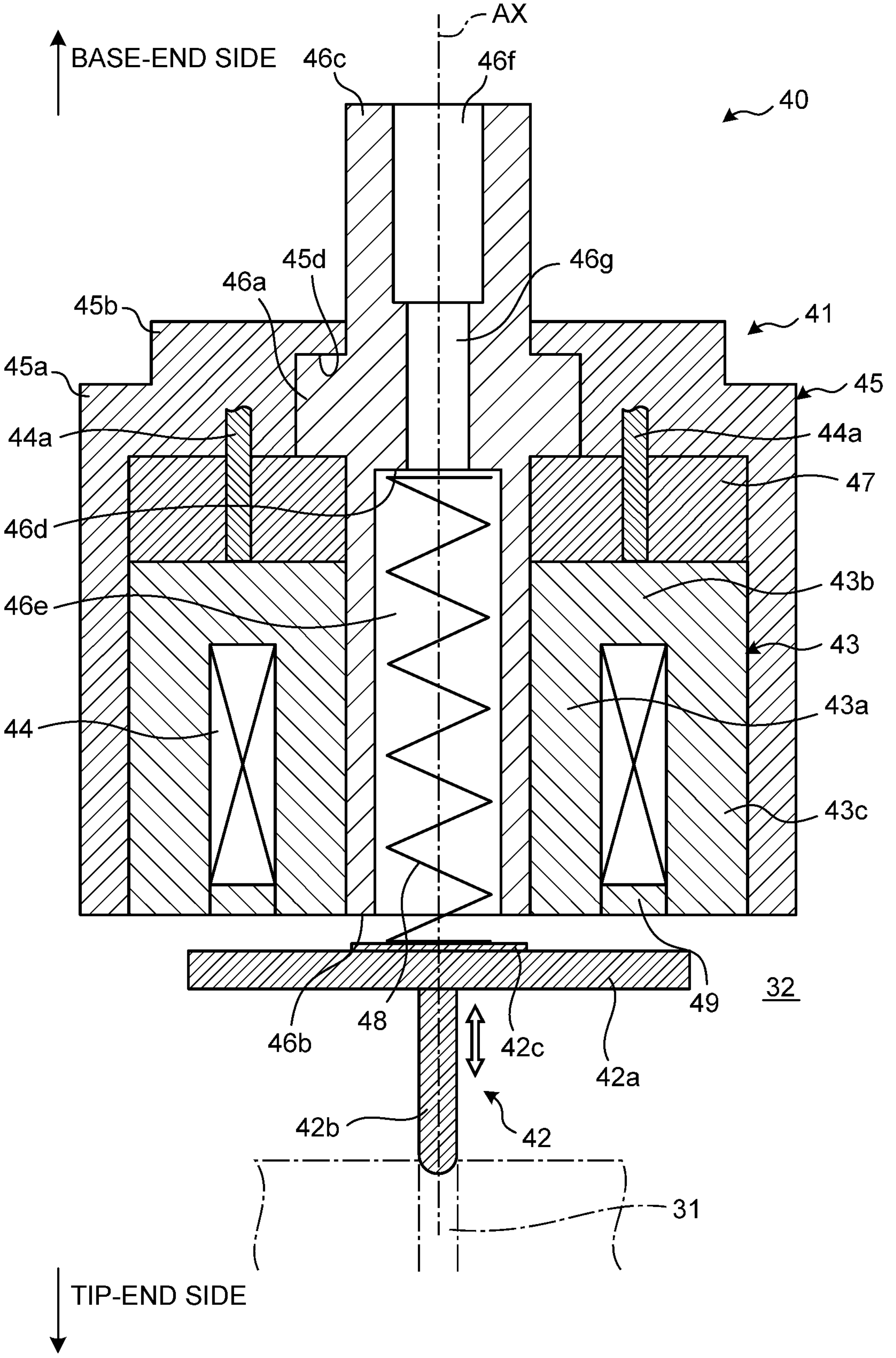
FIG. 3 is a longitudinal cross-sectional view of an example of an electromagnetic valve.

The electromagnetic valve 40 includes a solenoid device 41 and a valve unit 42. FIG. 3 is a longitudinal cross-sectional view of the electromagnetic valve 40. FIG. 3 illustrates an enlargement of a part of FIG. 2. As illustrated in FIG. 3, the solenoid device 41 uses the electromagnetic force to drive the valve unit 42 in the axial direction of the center axis AX. The solenoid device 41 includes a core 43, a coil 44, a casing 45, a cylindrical member 46, and a terminal fixing member 47.

The core 43 has a cylindrical portion 43*a*, a flange 43*b*, and a side surface 43*c*. The cylindrical portion 43*a* has a cylindrical shape, for example. The flange 43*b* has a disk-like shape, for example, and is disposed on the base-end side of the core 43. The cylindrical portion 43*a* and the flange 43*b* are disposed coaxially with the center axis AX of the fuel injector 13.

The side surface 43*c* has a cylindrical shape surrounding the cylindrical portion 43*a*. The side surface 43*c* is radially spaced from the cylindrical portion 43*a*, and extends toward the tip-end side. The cylindrical portion 43*a*, the flange 43*b*, and the side surface 43*c* are made from a magnetic material. The coil 44 is housed inside the space surrounded by the cylindrical portion 43*a*, the flange 43*b*, and the side surface 43*c* of the core 43. The space inside the core 43, where the coil 44 is disposed, is sealed by a seal member 49. The seal member 49 is made from a resin material, for example. The terminal fixing member 47 is disposed between the core 43 and the casing 45, which will be described later, in the axial direction of the center axis AX, and fixes the terminal 44*a* connected to the coil 44. The terminal 44*a* is pulled out to the external, in a manner of passing through the casing 45. The terminal fixing member 47 is made from a resin material, for example.

The coil 44 is disposed in a manner wound around the cylindrical portion 43*a*. The coil 44 is passed is through the casing 45, which will be described later, and connected to a power supply unit, not illustrated. The solenoid device 41 generates the electromagnetic force by applying electric current to the coil 44.

The core 43 and the coil 44 are housed inside the casing 45. The casing 45 includes a core housing 45*a* and a holder 45*b*. The core housing 45*a* and the holder 45*b* are configured as one piece made from a non-magnetic material. The core 43, including the coil 44, is housed inside the core housing 45*a*. The core housing 45*a* is disposed in a manner covering the flange 43*b* and the side surface 43*c* of the core 43. The holder 45*b* is positioned on the base-end side of the core housing 45*a*. The holder 45*b* holds the cylindrical member 46. The holder 45*b* includes a stepped portion 45*d* corresponding to a protrusion 46*a* of the cylindrical member 46, which will be described later. The shape, the dimensions, and the like of the stepped portion 45*d* are set in such a manner that the holder 45*b* holds the protrusion 46*a* in complete in contact with the protrusion 46*a*.

The cylindrical member 46 is housed inside of the holder 45*b* of the casing 45, and the terminal fixing member 47 and the core 43 are housed inside the core housing 45*a*. With this, it possible to achieve a structure in which the protrusion 46*a* is held in a manner nipped between the holder 45*b* of the casing 45 and the terminal fixing member 47, from both sides in the axial direction of the center axis AX.

Figure 4:
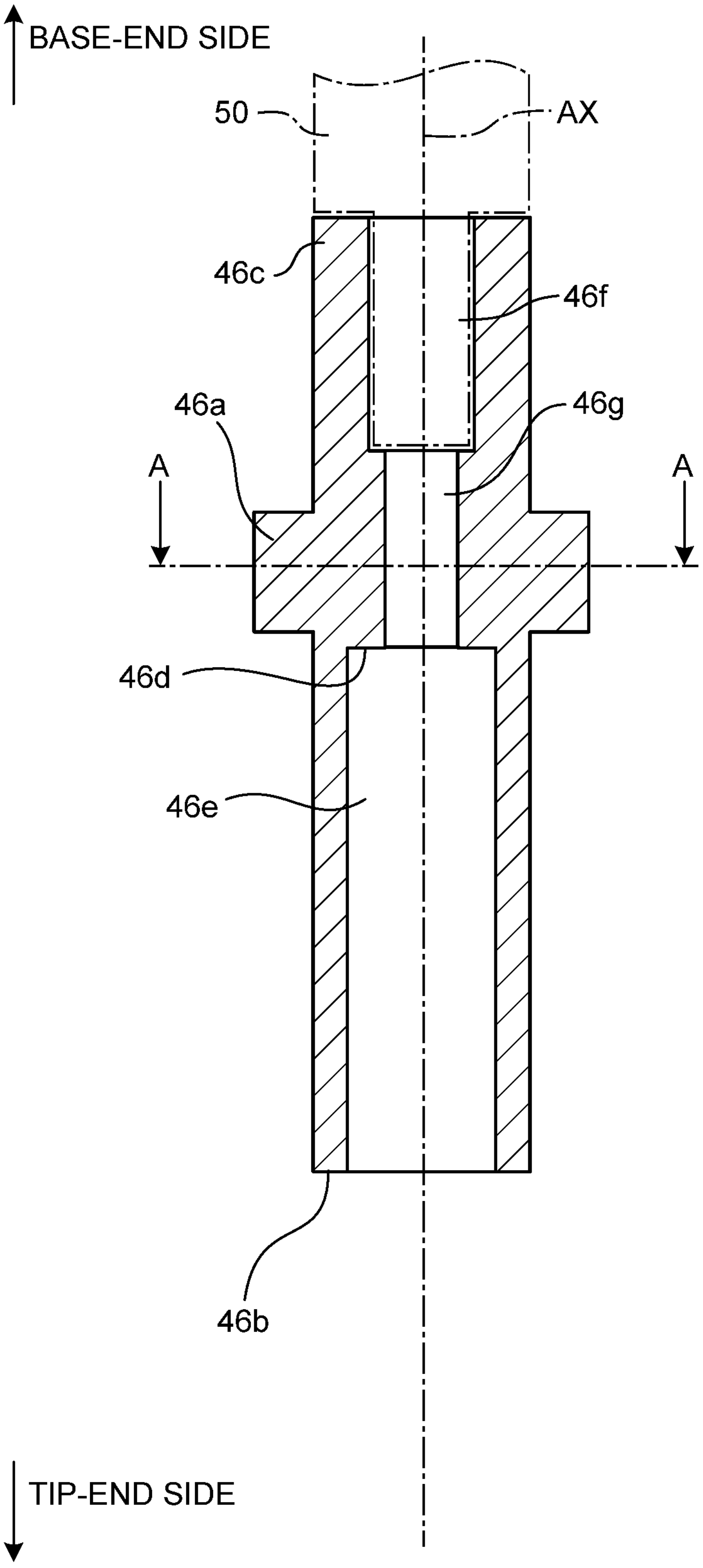
FIG. 4 is a longitudinal cross-sectional view of an example of a cylindrical member.

The cylindrical member 46 is provided in a manner of passing through the core 43 and the casing 45 in the axial direction of the center axis AX. FIG. 4 is a longitudinal cross-sectional view of the cylindrical member 46. FIG. 4 illustrates the cylindrical member 46 extracted from the electromagnetic valve 40 illustrated in FIG. 3. As illustrated in FIGS. 3 and 4, the cylindrical member 46 has a cylindrical shape, for example, and is disposed in such a manner that the center axis thereof is disposed coaxially with the center axis AX of the fuel injector 13.

The cylindrical member 46 has the protrusion 46*a*. The protrusion 46*a* protrudes radially from the outer circumference of the cylindrical member 46, in a direction perpendicular to the axial direction of the center axis AX. The protrusion 46*a* is held between the holder 45*b* of the casing 45 and the terminal fixing member 47, from both sides in the axial direction of the center axis AX. In other words, the stepped portion 45*d* holds the base-end side and the side surface of the protrusion 46*a*, and the terminal fixing member 47 holds the tip-end side, in the axial direction of the center axis AX. With this structure, axial movements of the cylindrical member 46 along the center axis AX are restricted. Thus, for example, it is possible to suppress a relative sliding movement of the cylindrical member 46 with respect to the inner circumference of the core 43, in the axial direction of the center axis AX. Therefore, it is possible to suppress wearing of the core 43. This structure also prevents entry of the fuel into the worn part of the core 43.

The cylindrical member 46 is disposed at a position where a tip-side end face 46*b* can be brought into contact with the valve unit 42. In this embodiment, the end face 46*b* is flush with an end face of the side surface 43*c* of the core 43 on the tip-end side, and with an end face of the seal member 49 on tip-end side, for example. The cylindrical member 46 may also be disposed at a position where the end face 46*b* projects out toward the tip-end side, with respect to the tip-end side end face of the side surface 43*c* and the tip-end side end face of the seal member 49.

A supporting portion 46*d* is provided along the inner circumference of the cylindrical member 46. The supporting portion 46*d* has a stepped shape in a cross-sectional view, as a smaller-diameter part of the cylindrical member 46. An elastic member 48 is housed in the cylindrical member 46, inside a space 46*e* between the end face 46*b* and the supporting portion 46*d*. The elastic member 48 is housed inside the space 46*e* with the base end thereof supported by the supporting portion 46*d*. The elastic member 48 applies an elastic force to the valve unit 42 in a direction toward the tip-end side in the axial direction of the center axis AX.

The cylindrical member 46 has a connecting portion 46*c*. The connecting portion 46*c* is provided in a manner protruding from the holder 45*b* of the casing 45 toward the base-end side. The connecting portion 46*c* is connected to an external fuel discharge channel 50. A space 46*f* is provided on the inner circumference side of the connecting portion 46*c*. The space 46*f* is connected to the space 46*e* via a connecting channel 46*g*. Therefore, the internal of the cylindrical member 46 is continuous across the tip-end side toward the base-end side. The space 46*e* of the cylindrical member 46 is connected to the electromagnetic-valve-side pressure chamber 32. Therefore, the cylindrical member 46 functions as a joint for connecting the electromagnetic-valve-side pressure chamber 32 to the external fuel discharge channel 50.

Figure 5:
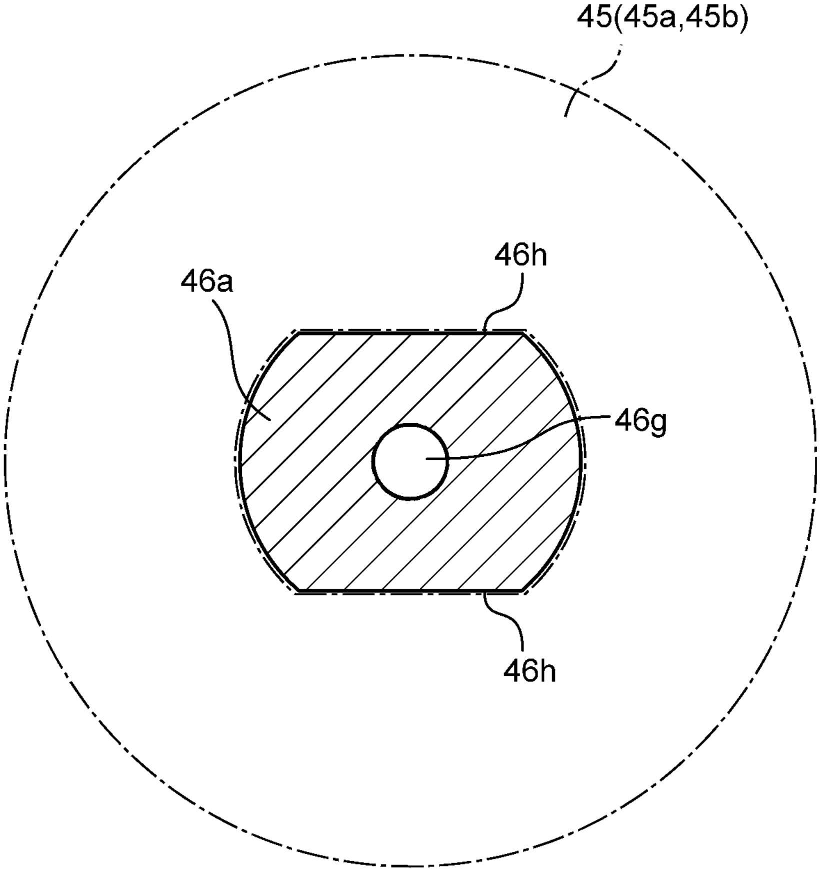
FIG. 5 is a schematic illustrating a cross-sectional structure along the line A-A in FIG. 4.

FIG. 5 is a schematic illustrating a cross-sectional structure along the line A-A in FIG. 4. As illustrated in FIG. 5, the protrusion 46*a* has mating portions 46*h* mating with the casing 45 around the axial direction of the center axis AX. The mating portion 46*h* has a shape, for example, as straight cutouts in portions of the arc of the protrusion 46*a*, in a view from the axial direction of the center axis AX. The casing 45 (the core-side portion 45*a* and the holder 45*b*) has an opening with straight portions corresponding to the respective mating portions 46*h*, in a view from the axial direction of the center axis AX. When the mating portions 46*h* are mated with the respective straight portions of the casing 45, the rotation of the cylindrical member 46 around the axial direction of the center axis AX is restricted. This engagement suppresses the sliding movement of the cylindrical member 46 with respect to the core 43 in the direction of the rotation.

As illustrated in FIG. 3, the valve unit 42 is moved in the axial direction of the center axis AX, by the electromagnetic force generated by the solenoid device 41. The valve unit 42 includes an armature 42*a*, a valve 42*b*, and a stepped portion 42*c*. The armature 42*a* is made from a magnetic material. The armature 42*a* has a disk-like shape, for example. The armature 42*a* is positioned in a manner facing the tip-end side of the core 43 of solenoid device 41. The valve 42*b* extends from the armature 42*a* toward the tip-end side. The tip end of the valve 42*b* has a shape enabled to close the fuel discharge port 31.

The stepped portion 42*c* is provided as a projection projecting toward the solenoid device 41, at the center of the armature 42*a*. The stepped portion 42*c* has a shape and dimensions bringing the stepped portion 42*c* into abutment against the end face 46*b* of the cylindrical member 46, when the valve unit 42 is retracted toward the solenoid device 41. The stepped portion 42*c* receives the elastic force of the elastic member 48. The elastic force of the elastic member 48 is transmitted to the armature 42*a* and the valve 42*b* via the stepped portion 42*c*. The armature 42*a* and the valve 42*b* receive the elastic force of the elastic member 48, in the direction toward the tip-end side of the axial end of the center axis AX. It is also possible for the stepped portion 42*c* not be provided.

An operation of the fuel injector 13 having the structure as described above will now be explained. While no current is applied to the coil 44 of the solenoid device 41, no electromagnetic force is generated in the solenoid device 41. At this time, the valve unit 42 is caused to press the valve 42*b* against the fuel discharge port 31 toward the tip-end side by the elastic force of the elastic member 48. The fuel discharge port 31 is thus kept closed.

While the fuel discharge port 31 is closed, the net force of the pressure received from the control-side pressure chamber 28 and the elastic force of the elastic member 23 is greater than the pressure received from the injection-side pressure chamber 27. As a result, the piston valve 22 blocks and closes the fuel injection port 30.

Figure 6:
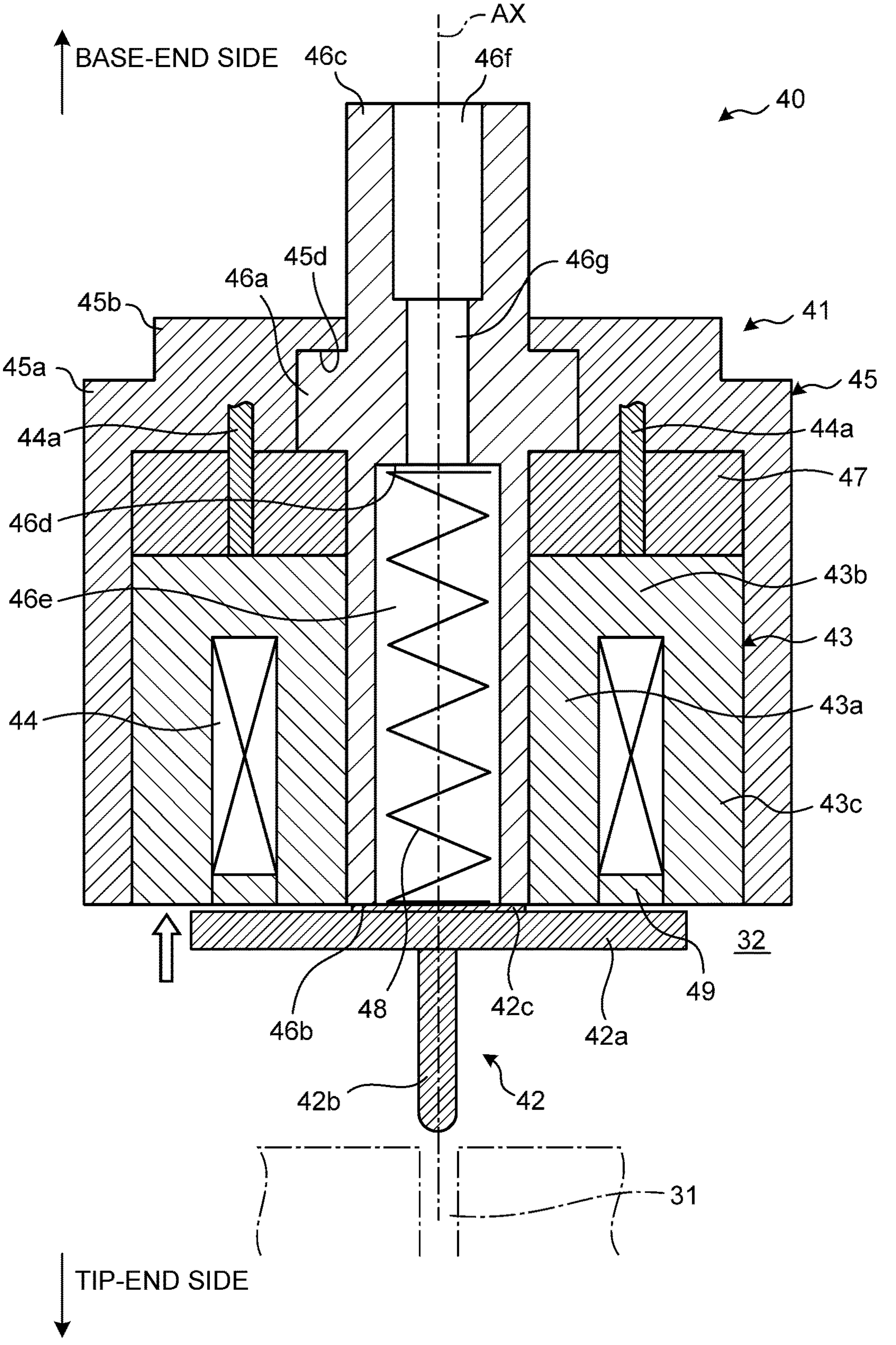
FIG. 6 is a longitudinal cross-sectional view illustrating an example of an operation of the electromagnetic valve.

When a current is applied to the coil 44 of the solenoid device 41, an electromagnetic force is generated in the solenoid device 41. FIG. 6 is a longitudinal cross-sectional view illustrating an example of an operation of the electromagnetic valve 40. FIG. 6 illustrates an example of the configuration with a current being applied to the coil 44. As illustrated in FIG. 6, when the electromagnetic force is generated in the solenoid device 41, the armature 42*a* of the valve unit 42 is attracted toward the core 43 by the electromagnetic force, and the valve 42*b* is separated from the fuel discharge port 31. As a result, the fuel discharge port 31 opens.

As the fuel discharge port 31 opens, the pressure inside the control-side pressure chamber 28 drops. When the net force of the pressure received from the control-side pressure chamber 28 and the elastic force of the elastic member 23 becomes smaller than the pressure received from the injection-side pressure chamber 27, the piston valve 22 is caused to move toward the control-side pressure chamber 28. At this time, the valve 22*d* of the piston valve 22 is then separated from the fuel injection port 30, and the fuel injection port 30 is opened. When the fuel injection port 30 opens, the fuel having passed through the fuel inlet 24 and the injection-side channel 25, and having entered the injection-side pressure chamber 27 is injected from the fuel injection port 30.

During this operation, as the valve unit 42 is attracted toward the core 43, by the electromagnetic force of the solenoid device 41, the stepped portion 42*c* of the valve unit 42 is brought into contact with the end face 46*b* of the cylindrical member 46, as illustrated in FIG. 6. At this time, the cylindrical member 46 serves as a stopper for restricting the movement of the valve unit 42 toward the base-end side.

When the stepped portion 42*c* is brought into contact with the end face 46*b* of the cylindrical member 46, the internal of the solenoid device 41, such as the core 43, receives the impact, via the cylindrical member 46. In the solenoid device 41 according to this embodiment, the protrusion 46*a* of the cylindrical member 46 is held between the casing 45 and the terminal fixing member 47, from both sides in the axial direction of the center axis AX. Therefore, the casing 45 and the terminal fixing member 47 receive the impact caused when the valve unit 42 is brought into contact with the cylindrical member 46. By the valve unit 42 being brought into contact, the movement of the cylindrical member 46 in the axial direction of the center axis AX is restricted. As a result, sliding movement of the cylindrical member 46 and the core 43 with respect to each other is suppressed, and damages such as wearing of the inner surface of the core 43 are suppressed.

As described above, the solenoid device 41 according to this embodiment is the solenoid device 41 configured to drive the valve unit 42 included in the electromagnetic valve 40 provided to the fuel injection system 10, using electromagnetic force, and includes the core 43 that is cylindrical, the coil 44 that is wound around the core 43, the casing 45 in which the core 43 and the coil 44 are housed, and that covers at least one end of the core 43, the one end being an end in the axial direction of the center axis AX of the core 43, the terminal fixing member 47 that is disposed between the core 43 and the casing 45 in the axial direction, and that fixes the terminal 44*a* connected to the coil 44, and the cylindrical member 46 that is disposed on an inner circumference of the core 43, in a manner of passing through the core 43 and the casing 45 in the axial direction, and that includes a protrusion 46*a* protruding in a radial direction perpendicular to the axial direction and held between casing 45 and the terminal fixing member 47 from both sides in the axial direction, and that is disposed at a position where the valve unit 42 is allowed to be brought into contact with the end face 46*b*.

In this configuration, the protrusion 46*a* of the cylindrical member 46 is held between the casing 45 and the terminal fixing member 47, from both sides in the axial direction of the center axis AX. This configuration allows the casing 45 and the terminal fixing member 47 to receive the impact caused by the valve unit 42 being brought into contact with the cylindrical member 46. By the valve unit 42 being brought into contact, the movement of the cylindrical member 46 in the axial direction of the center axis AX is restricted. As a result, sliding movement of the cylindrical member 46 and the core 43 with respect to each other is suppressed, and damages such as wearing of the inner surface of the core 43 are suppressed. In this manner, it becomes possible to provide a solenoid device 41 with excellent shock resistance.

In the solenoid device 41 according to this embodiment, the protrusion 46*a* has mating portions 46*h* mating with the casing 45 around the axial direction of the center axis AX. With this configuration, a rotation of the cylindrical member 46 around the axial direction of the center axis AX is suppressed. Therefore, it is possible to prevent damages of the core 43 and other parts of the solenoid device 41 more reliably.

In this solenoid device 41, one end of the cylindrical member 46 in the axial direction has a connecting portion 46*c* to be connected to the external fuel discharge channel 50. With this configuration, the number of parts can be reduced because the portion being brought into contact with the valve unit 42 and the joint connected with the fuel discharge channel 50 are provided on a single member, the cylindrical member 46.

The electromagnetic valve 40 in the fuel injection system 10 according to this embodiment includes the solenoid device 41 described above, and the valve unit 42 that is made from a magnetic material, disposed facing the other end of the core 43 in the axial direction, and applied with an elastic force in the direction separating from the core 43 in the axial direction. The valve unit 42 is caused to block and close a fuel passage by the elastic force when no electromagnetic force is generated by the solenoid device 41, and the valve unit 42 is attracted toward the core 43 by the electromagnetic force to a position where the valve unit 42 is brought into contact with the cylindrical member 46, and is separated from the passage, thereby opening the passage, when the electromagnetic force is generated by the solenoid device 41.

Because this configuration includes the solenoid device 41 capable of suppressing damages of the internal structures, it is possible to achieve an electromagnetic valve 40 with high shock resistance.

In the electromagnetic valve 40 in the fuel injection system 10 according to this embodiment, the cylindrical member 46 includes the supporting portion 46*d* that supports the elastic member 48 by which an elastic force is applied to the valve unit 42. With this configuration, because the portion brought into contact with the valve unit 42 and the supporting portion 46*d* of the elastic member 48 are provided on a single member, the cylindrical member 46, it is possible to reduce the number of parts.

The technical scope of the invention is not limited to the embodiment described above, and modifications may be made, as appropriate, within the scope not deviating from the essence of the invention. For example, explained above in the embodiment is an example of a configuration in which the electromagnetic valve 40 is installed in the fuel injector 13 of the fuel injection system 10, but the embodiment is not limited thereto. The electromagnetic valve 40 may also be installed in another part of the fuel injection system 10.

The configurations of the fuel injection system 10 and the fuel pump 11 are not limited to those described above in the embodiment. For example, the number of common rails 12 and the fuel injectors 13, and the position at which the fuel pump 11 is connected may be set as appropriate.

REFERENCE SIGNS LIST

10 Fuel injection system
11 Fuel pump
12 Common rail
13 Fuel injector
14 Fuel tank
20 Injection unit
21, 45 Casing
22 Piston valve
22*a* Spring seat member
22*b* Control-side piston member
22*c* Joint member
22*d*, 42*b* Valve
23, 48 Elastic member
24 Fuel inlet
25 Injection-side channel
26 Control-side channel
27 Injection-side pressure chamber
28 Control-side pressure chamber
29 Cylinder chamber
30 Fuel injection port
31 Fuel discharge port
32 Electromagnetic-valve-side pressure chamber
40 Electromagnetic valve
41 Solenoid device
42 Valve unit
42*a* Armature
42*c*, 45*d* Stepped portion
43 Core
43*a* Cylindrical portion
43*b* Flange
43*c* Side surface
44 Coil
44*a* Terminal
45*a* Core housing
45*b* Holder
46*b* End face
46 Cylindrical member
46*a* Protrusion
46*c* Connecting portion
46*d* Supporting portion
46*e*, 46*f* Space
46*g* Connecting channel
46*h* Mating portion
47 Terminal fixing member
49 Seal member
50 Fuel discharge channel
AX Center axis
L11 Fuel line
L12 High-pressure fuel line
L13 Fuel supply line

The invention claimed is:

1. A solenoid device configured to drive by electromagnetic force a valve unit in an electromagnetic valve provided to a fuel injection system, the solenoid device comprising:

a cylindrical core made from a magnetic material;

a coil that is wound around the core;

a casing that houses the core and the coil and covers at least one end of the core on one side in an axial direction of a center axis;

a terminal fixing member that is disposed between the core and the casing in the axial direction to fix a terminal connected to the coil, made from a resin material; and a cylindrical member that is disposed on an inner circumference of the core in a manner of passing through the core and the casing in the axial direction, the cylindrical member having a protrusion that radially protrudes in a direction perpendicular to the axial direction and is held between the casing and the terminal fixing member from both sides in the axial direction, the cylindrical member having an end on another side of the axial direction located at a position that is allowed to come into contact with the valve unit, wherein the cylindrical member has its end portion on the opposite side of the axial direction in a coplanar state with the end portion of the valve unit side of the core, or protruding toward the valve unit side of the core relative to the end portion of the valve unit side of the core.

2. The solenoid device according to claim 1, wherein the protrusion has a mating portion mating with the casing around the axial direction of the center axis.

3. The solenoid device according to claim 1, wherein one end of the cylindrical member in the axial direction has a connecting portion to be connected to an external fuel discharge channel.

4. An electromagnetic valve for a fuel injection system, comprising:

the solenoid device according to claim 1; and a valve unit that is made from a magnetic material, disposed facing an end of the core on the other side in the axial direction, and applied with an elastic force in a direction separating from the core in the axial direction, the valve unit being configured to block and close a passage for fuel by the elastic force when no electromagnetic force is generated by the solenoid device, and to open the passage by being attracted toward the core by the electromagnetic force to a position where the valve unit is brought into contact with the cylindrical member so that the valve unit is separated from the passage, when the electromagnetic force is generated by the solenoid device.

5. The electromagnetic valve for a fuel injection system according to claim 4, wherein the cylindrical member has a supporting portion that supports an elastic member for applying the elastic force to the valve unit.

* * * * *